ALEXANDER S. RAMAGE, OF DETROIT, MICHIGAN.

PROCESS OF REGENERATING WASTE LIQUORS FROM THE MANUFACTURE OF CHROME PIGMENTS.

No. 855,019.    Specification of Letters Patent.    Patented May 28, 1907.

Application filed March 27, 1907. Serial No. 364,823.

*To all whom it may concern:*

Be it known that I, ALEXANDER S. RAMAGE, a citizen of the United States, residing at Detroit, in the county of Wayne and State of Michigan, have invented certain new and useful Improvements in Processes of Regenerating Waste Liquors from the Manufacture of Chrome Pigments, of which the following is a specification.

The object of this invention is to provide a process by which waste liquors from the manufacture of chrome pigments may be regenerated.

In the manufacture of chromates of lead, or yellow chromes, litharge is dissolved in acetic acid, the amount of acetic acid used depending upon whether it is desired to produce a basic or neutral chromate. For the production of the basic chromates, or orange shades, the proportion of acetic acid is sufficient only to yield basic acetate of lead, whereas for the production of the light shades, neutral acetate of lead is prepared. After the precipitation of the pigment by sodium bichromate, the clear liquor from the orange shades contains substantially all its acetic acid in the form of sodium acetate, whereas the liquor from the light chromes contains both sodium acetate and free acetic acid. As chrome pigments are as a rule precipitated from weak solutions, the resulting liquors are highly dilute and the recovery of acetic acid therefrom is correspondingly expensive. In common practice these liquors are run to waste and constitute a large proportion of the expense of manufacturing chrome pigments.

According to the preferred form of my invention, there is added to such dilute liquors a sufficient proportion of free acetic acid to restore their solvent power, and the acidulated liquors are then utilized for dissolving fresh quantities of lead and precipitating the chrome pigments in the usual manner. It is obvious that the liquors from the orange shades will require a greater proportion of acetic acid than those from the yellow shades. This process is repeated until sodium acetate has accumulated in the liquor to the extent of ten per cent. or more. This liquor may contain in addition to sodium acetate smaller proportions of free acetic acid and lead acetate, or of free acetic acid and sodium bichromate in accordance with the character of the pigment last produced, an excess of acetate of lead being present in the formation of the light shades and a slight excess of bichromate with the deeper shades; in the latter case sufficient lead acetate is added to precipitate the chromic acid. The resulting liquor will then be identical in composition with that resulting from the precipitation of the lighter pigments.

To the liquor containing essentially sodium acetate, lead acetate, and free acetic acid, soda ash or lime is added in proportion sufficient to precipitate the lead. The liquor is then allowed to stand until the precipitate settles and is then run off into an evaporator, where it is concentrated until it contains from twenty to thirty percent of sodium acetate. The concentrated liquor is then run into a tank where it is cooled, usually by contact with pipes conveying cold water. The quantity of sodium acetate in the liquor is then ascertained by test, and sufficient sulfuric acid is added to liberate a large proportion, say about ninety percent, of the acetic acid therein. The liquor is then further cooled, say to thirty degrees Fahrenheit, at which point ninety percent of the sodium sulfate separates out in crystalline form, leaving a liquor consisting essentially of acetic acid, some sodium acetate and some sodium sulfate. The mass is run through a hydro-extractor, the sodium sulfate crystals being washed with ice cold water. The size of the crystals of sodium sulfate depends upon the concentration of the sodium acetate solution to which sulfuric acid is added and upon the rate of crystallization.

In practice it is preferred to produce comparatively large crystals, and this is best accomplished by concentrating the liquor to about twenty percent of sodium acetate, adding sulfuric acid as described, and permitting the crystallization to occur during a period of about eight hours. The sodium sulfate crystals washed as above described can be dried in the usual way, forming anhydrous sodium sulfate. In case the lead is precipitated from the original liquor by means of lime, this sodium sulfate will be accompanied by calcium sulfate, from which it is readily separated by solution and re-crystallization.

The liquor containing acetic acid, sodium acetate and sodium sulfate is now treated to separate sulfuric acid, which is conveniently effected by the addition of lead oxid or lead acetate in quantities sufficient to precipitate all of the sulfuric acid as lead sulfate; the liquid is thereby fully regenerated and in practice utilized for the preparation of further quantities of lead acetate for the continuance of the manufacture of the chrome pigments. Preferably the precipitated lead sulfate is heated with sodium carbonate and thereby converted into lead carbonate, which after washing is dissolved in the regenerated liquor for the production of lead acetate.

As an alternative method of separating sulfuric acid from the mother liquor from the crystallizing tanks, an equivalent proportion of barium carbonate or other suitable barium compound may be added, the precipitate in this case comprising barium sulfate, or blanc fixe, which can be utilized in all color works.

I claim:

1. The process of regenerating waste liquors from chrome pigment manufacture which consists in concentrating said liquors, liberating acetic acid therein by addition of sulfuric acid, separating sodium sulfate by refrigeration, and utilizing the resulting acid solution for the preparation of lead acetate.

2. The process of regenerating waste liquors from chrome pigment manufacture which consists in concentrating said liquors, liberating acetic acid therein by addition of sulfuric acid, separating a portion of the sodium sulfate by refrigeration, separating the remaining sulfuric acid by precipitation and utilizing the resulting acid solution for the preparation of lead acetate.

3. The process of regenerating waste liquors from chrome pigment manufacture which consists in adding acetic acid to said liquors, dissolving a lead compound therein and precipitating a chrome pigment, repeating the operation to concentrate the alkali acetate in the liquor, concentrating the resulting liquor by evaporation, liberating acetic acid therein by addition of sulfuric acid, separating sodium sulfate by refrigeration, and utilizing the resulting acid solution for the preparation of lead acetate.

4. The process of regenerating waste liquors from chrome pigment manufacture which consists in concentrating said liquors, liberating acetic acid therein by addition of sulfuric acid, separating sodium sulfate by refrigeration, utilizing the resulting acid solution for the preparation of lead acetate, and precipitating a chromate of lead from said solution.

5. The cyclical process of regenerating waste liquors from chrome pigment manufacture which consists in concentrating said liquors, liberating acetic acid therein by addition of sulfuric acid, separating sodium sulfate by refrigeration, utilizing the resulting acid solution for the preparation of lead acetate, precipitating a chromate of lead from said solution, and utilizing the liquor in continuing the process.

6. The cyclical process of regenerating waste liquors from chrome pigment manufacture, which consists in adding acetic acid to said liquor, dissolving a lead compound therein and precipitating a chrome pigment, repeating the operation to concentrate the alkali acetate, further concentrating the resulting liquor by evaporation, liberating acetic acid therein by addition of sulfuric acid, separating a portion of the sodium sulfate by refrigeration, separating the remaining sulfuric acid by precipitation, utilizing the resulting acid solution for the preparation of lead acetate, precipitating a chromate of lead from said solution, and utilizing the liquor in continuing the process.

In testimony whereof, I affix my signature in presence of two witnesses.

ALEXANDER S. RAMAGE.

Witnesses:
 FORD D. C. HINCHMAN,
 ALFRED ASHBY.